United States Patent [19]

Burns et al.

[11] 4,262,993

[45] Apr. 21, 1981

[54] ELECTROOPTICALLY BALANCED ALTERNATING $\Delta\beta$ SWITCH

[75] Inventors: William K. Burns, Alexandria; Sang K. Sheem, Springfield, both of Va.

[73] Assignee: The United States of America as represented by the Secretary of the Navy, Washington, D.C.

[21] Appl. No.: 111,443

[22] Filed: Jan. 11, 1980

[51] Int. Cl.³ .............................................. G02B 5/14
[52] U.S. Cl. ................................. 350/96.14; 350/355
[58] Field of Search ............... 350/96.12, 96.13, 96.14, 350/355, 356

[56] References Cited

U.S. PATENT DOCUMENTS

| | | | |
|---|---|---|---|
| 3,874,782 | 4/1975 | Schmidt | 350/96.13 |
| 3,877,781 | 4/1975 | Kaminow | 350/96.14 |
| 4,012,113 | 3/1977 | Kogelnik et al. | 350/96.13 |
| 4,048,591 | 9/1977 | Auracher | 350/96.14 X |
| 4,070,094 | 1/1978 | Martin | 350/96.14 |
| 4,094,579 | 6/1978 | McMahon et al. | 350/96.14 X |
| 4,157,860 | 6/1979 | Marcatili | 350/96.14 |

OTHER PUBLICATIONS

Burns et al, "Interferometric Waveguide Modulator With . . . ", *Applied Phys. Lett.*, vol. 33, No. 11, Dec. 1978, pp. 944-947.
Schmidt et al, "Electro-Optically Switched Coupler With . . . ", *Applied Phys. Lett.*, vol. 28, No. 9, May 1976, pp. 503-506.
Kogelnik et al, "Switched Directional Couplers with Alternating $\Delta\beta$", *IEEE J.Q.E.*, vol. QE-12, No. 7, Jul. 1976, pp. 396-401.
Steinberg et al, "Performance Limitations Imposed on Optical . . . ", *Applied Optics,* vol. 15, No. 10, Oct. 1976, pp. 2440-2453.
Steinberg et al., "Polarization-Insensitive Integrated-Optical Switches: . . . ", *Applied Optics,* vol. 16, No. 8, Aug. 1977, pp. 2166-2170.

*Primary Examiner*—John K. Corbin
*Assistant Examiner*—John D. Lee
*Attorney, Agent, or Firm*—R. S. Sciascia; William T. Ellis; Philip Schneider

[57] ABSTRACT

An electrooptical waveguide switching device comprising three sections of abutting crystalline substrates, the easy axis of each substrate being orthogonal to that of its neighbors. Each substrate is formed with a pair of waveguide sections which couple with those of the other sections, when the substrates are abutted, to form a pair of waveguide channels across the substrate sections. Sets of electrodes for directing horizontal and vertical electric fields through one waveguide channel are also formed on the substrate sections symmetrically about an axis of symmetry.

3 Claims, 11 Drawing Figures

ELECTROOPTICALLY BALANCED ALTERNATING Δβ SWITCH

BACKGROUND OF THE INVENTION

This invention relates to electrooptic waveguide assemblies and especially to an electrooptic modulator/switch in which the effect of the modulating electric fields on the TE and TM modes propagating through electrooptic waveguides is balanced.

It is well known that the magnitude of index of refraction can be changed by applying an external electric field in some crystals. This property has been widely utilized for the switching and modulation of guided as well as unguided (bulk) optical beams. In general, selection of proper crystal orientation is a prerequisite for successful operation of electrooptic devices since the electrooptic effect is anisotropic.

Over the past decade, fiber optics and integrated optics have been vigorously developed in an attempt to realize compact, high-capacity, optical, information-processing devices for optical communication. The idea is to develop various active devices for optical-beam switching, modulation, or multiplexing, and to link the active devices by optical fibers over substantial distances, thus forming optical communication networks. Throughout such networks, the optical beam is guided by optical waveguides for the purpose of optical energy confinement and directional guidance.

Recently, it was found that in optical fibers the polarization (the direction of the electric field of the optical beam) of guided modes is unpredictably fluctuating: the guided mode does not maintain linear polarization but rather an unknown elliptical polarization. (Reference: "Performance limitations imposed on optical waveguide switches and modulators by polarization, "Applied Optics, Vol. 15, p. 2440, 1976, by R. A. Steinberg and T. G. Giallorenzi). Such elliptical polarization occurs because optical fibers have a circular cross-section which, due to slight stress or disturbance, allows the polarization to rotate.

On the other hand, in channel waveguides, there exists two orthogonal propagation modes the polarizations of which are (predictably) definite. Especially, in isotropic waveguides and cubic orientation anisotropic waveguides, the eigenmode polarization is either mainly parallel or mainly perpendicular to the waveguide surface. As a result, for beam coupling from fiber to channel waveguides, the beam from the fiber generally excites both orthogonal modes, each having different polarization. Since, as mentioned above, the electrooptic effect is anisotropic in general, one propagation mode experiences greater electrooptic effect (i.e., index change) than the other. Thus, simultaneous switching or modulation of both propagation modes is not achievable unless some specific means is devised to correct or balance the electrooptic effects for both modes.

SUMMARY OF THE INVENTION

Accordingly, it is an object of the present invention to provide a means to balance the electrooptic effects for both propagation modes so that an optical wave with either polarization can be switched or modulated with a driving voltage comparable to that required for switching and modulation of the other polarization.

The invention comprises an electrooptic modulator switch having sets of electrodes and waveguides formed on a crystalline substrate, the electrode sets applying vertically directed (vertical) and horizontally directed (horizontal) electric fields to one of the waveguides through which optical radiation is directed. By forming the substrate in abutting sections each of which has its easy axis orthogonal to that of the abutting substrate section or sections, the effects of the horizontal and vertical fields can be balanced and the voltages required for modulation and switching can be reduced.

The detailed features, objects and advantages of the present invention will be further clarified in the following description.

DETAILED DESCRIPTION OF THE INVENTION

Figure 1:
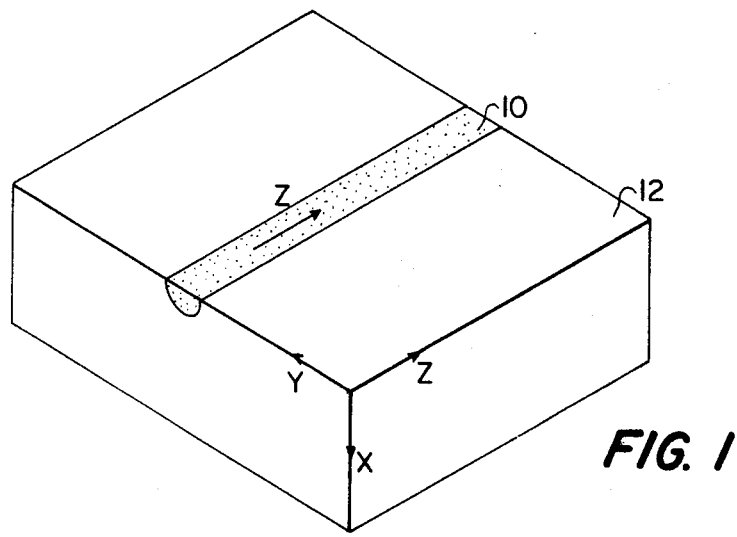
FIG. 1 is a schematic perspective diagram of an optical channel waveguide (dotted region) fabricated in an electrooptic crystal substrate block.
Figure 2:
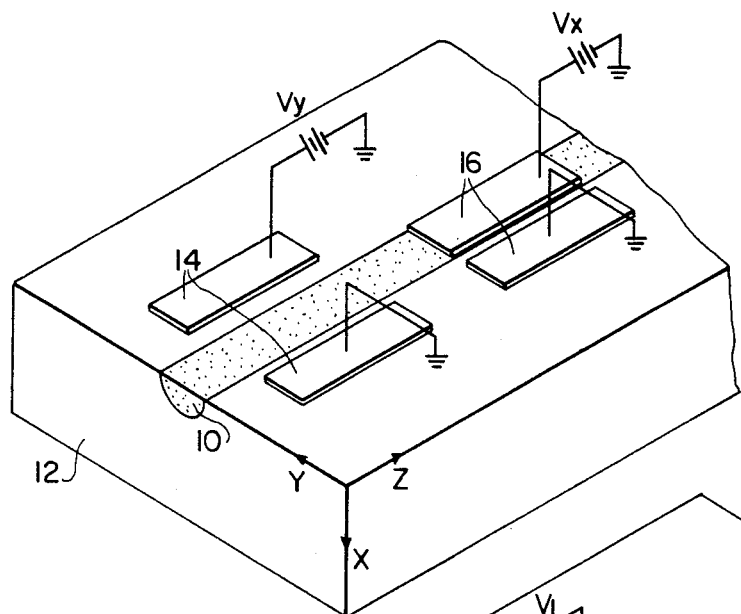
FIG. 2 is a perspective view showing the conventional way to realize polarization-insensitive electrooptic operation.

FIG. 1 shows a schematic view of an optical channel waveguide 10 fabricated on top of electrooptic crystal substrate block 12. In general the crystal material is dielectric and frequently optically anisotropic. The channel waveguide 10 can be in or on the surface of the crystal substrate and fabricated by various methods which include indiffusion of foreign materials at high temperature, bombardment of the guiding region by ions in the vacuum environment, or epitaxial growth. Regardless of techniques employed, the channel region 10 can trap and guide an optical beam if the index of refraction in the region is higher than that of the surrounding regions that include the crystal substrate and superstrate top region, which is usually air. For convenience, assume the spatial coordinate system as shown and further assume optical wave propagation in the z-direction. It is well known that in electromagnetic waveguides such as shown in FIG. 1 there exist two kinds of propagating modes wherein one mode has its electric field in one orientation, and the other mode in the orthogonal orientation. When the coordinate axes X, Y, and Z, in FIG. 1 coincide with the crystallographic axes, there are the TE-mode having its electric field dominantly parallel to the Y axis and TM-mode having its electric field dominantly parallel to the X-axis. (The invention will be described with respect to this orientation of the waveguide axes although the invention will operate with other orientations; however, the principle is simpler to explain when the waveguide and crystal axes are coincident.) When an external electric field is applied across pairs of electrodes 14 or 16 as shown in FIG. 2, the index of refraction of the waveguide 10 changes, the amount of change being different for one mode compared to that of the orthogonal mode. Assume that a propagating mode with one polarization experiences an index change of an amount $(\Delta n_1)$ and the other mode with the orthogonal polarization of an amount $(\Delta n_2)$. Then, in general, $$(\Delta n_1)_y = f_y(V_y) \quad (1)$$

$$(\Delta n_1)_x = p_x(V_x) \quad (2)$$

$$(\Delta n_2)_y = g_y(V_y) \quad (3)$$

$$(\Delta n_2)_x = q_x(V_x) \quad (4)$$

where f, g, p and q are proper functional forms; and the subscript y (or x) denotes that the applied field is dominantly parallel to the Y-(or X-) axis. If $V_x=0$ but $V_y\neq 0$ in FIG. 2, we have, from (1)–(4), $$(\Delta n_1) = (\Delta n_1)_y = f_y(V_y)$$

$$(\Delta n_2) = (\Delta n_2)_y = g_y(V_y)$$

and in general $$(\Delta n_1) \neq (\Delta n_2)$$

In order to satisfy the condition $(\Delta n_1)=(\Delta n_2)$, we can apply both voltages $V_y$ and $V_x$ in FIG. 2 and try to find the solutions for $V_y$ and $V_x$ that satisfy the following equation:

$$\begin{aligned}(\Delta n_1) &= (\Delta n_1)_y + (\Delta n_1)_x \\ &= f_y(V_y) + p_x(V_x) \\ &= g_y(V_y) + q_x(V_x) \\ &= (\Delta n_2)_y + (\Delta n_2)_x = (\Delta n_2)\end{aligned} \quad (5)$$

However, in general, the solution for $V_x$ is at least a few times larger than the solution for $V_y$ in (5), or vice versa, when the lengths of electrodes are the same. This is because the electrooptic effect is strongest only when the applied electric field is along some specific direction, for example, the Y-direction. Furthermore, even in the case of optimum field direction, the electrooptic effect for one mode (1) is usually larger than that for the other mode (2). For example, if we assume that LiNbO$_3$ crystal is used in the waveguide structure shown in FIGS. 1 and 2, $V_y$ and $V_x$ should be different by a factor of five if one wants to utilize the $r_{33}$ electrooptic coefficient which is the largest. As a result, one would need only use several volts for $V_y$ but tens of volts for $V_x$ if the Y-axis coincides with the optic axis of the LiNbO$_3$ crystal. (As assumed above, the electrooptic effect is strongest when the field is parallel to the Y-axis. In LiNbO$_3$ this means that the Y-axis coincides with the optic axis). In short, it is not possible to lower both voltages $V_x$ and $V_y$ in the scheme of FIG. 2 when one wishes to satisfy the condition $(\Delta n_1)=(\Delta n_2)$, which is the necessary condition for simultaneous switching and modulation of both orthogonal modes of different polarizations.

Figure 3:
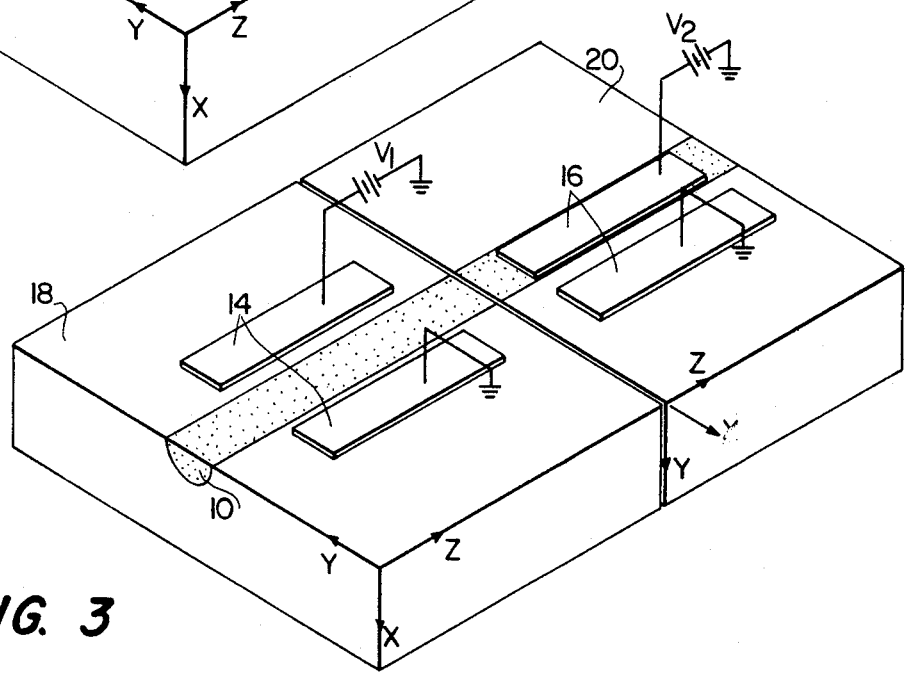
FIG. 3 is a schematic perspective view of a basic unit of the present invention wherein two crystal blocks are butt-jointed so that the channel waveguides are aligned in a series to form a straight waveguide as a combination.

FIG. 3 shows the basic unit of the present invention which solves the problem described above. Here, two pieces of crystal substrate blocks 18 and 20 are connected in series by the face-to-face joint method. As shown, the first block has the Y-axis parallel to the substrate surface plane while the second block has the Y-axis perpendicular to it. Thus, when electrodes 14 and 16 are fabricated as shown, it is clear that the resultant applied electric fields will be dominantly parallel to the Y-axis in both waveguide blocks 18 and 20. Thus, if the electrooptic effect is strongest when the applied electric field is parallel to the Y-axis, as we assumed above, it is clear that, in FIG. 3, the applied fields are along the optimum direction in both blocks 18 and 20. On the other hand, the relative orientations between the Y-axis and the polarization directions of the propagating modes are switched in the second block 20 compared to that in the first block 18. For example, a TE-mode would be dominantly parallel to the Y-axis in the first block 18, but dominantly perpendicular to it in the second block 20. A TM-mode would have the opposite situation. As a result, both modes would have experienced the same or quite similar amounts of electrooptic effect after having propagated through the channel waveguide 10 being formed by the two butt-jointed channel waveguide sections fabricated in the first and second waveguide blocks.

Figure 4:
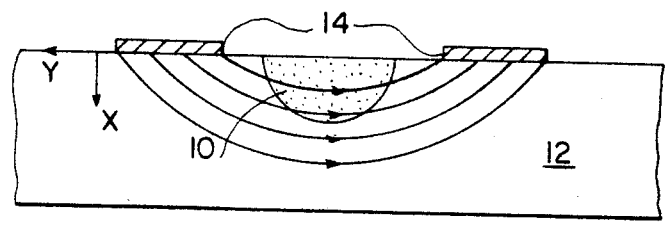
FIG. 4 is a partial diagram showing the applied electric field across the channel waveguide.
Figure 5:
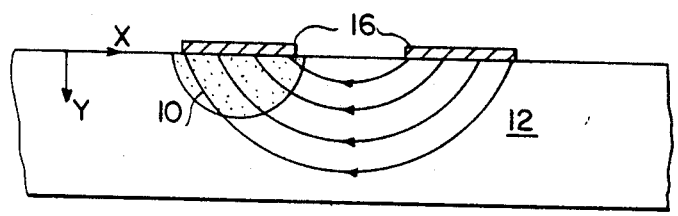
FIG. 5 is a partial diagram showing the applied electric field crossing the channel waveguide mainly in the direction perpendicular to the substrate surface.

If the notations employed in (1)–(5) above are used:

$$(\Delta n_1) = f_y(V_1) + g_y(V_2) \quad (6)$$

$$(\Delta n_2) = g_y'(V_1) + f_y'(V_2), \quad (7)$$

where $f_y$ and $f_y'$ (and $g_y$ and $g_y'$) have very similar functional forms, but would not be exactly the same in general. The origin of the difference comes from the geometrical difference as pointed out in FIGS. 4 and 5. As shown, the electric fields represented by arrowed curves are dominantly parallel to the Y-axis in the channel waveguide regions 10 in both cases. Although the effective ratio between the X- and Y-components of electric fields cannot be made exactly equal in both cases due to the different geometrical arrangements of electrodes and the resulting field mapping, it is clear that it is not difficult to insure by proper design of electrodes that:

$$f_y = f_y' \quad (8)$$

$$g_y = g_y' \quad (9)$$

In that case, from (6)–(9), we get:

$$(\Delta n_1) = (\Delta n_2) \text{ when } V_1 = V_2 \quad (10)$$

where $V_1$ and $V_2$ are solutions of $$f_y(V_1) + g_y(V_2) = f_y'(V_2) + g_y'(V_1) \quad (11)$$

In other words, the magnitudes $V_1$ and $V_2$ can be made near-minimum simultaneously. In the LiNbO$_3$ case, if the optic axis coincides with the Y-axis in FIG. 3, $V_1$ and $V_2$ can be simultaneously made as small as several volts.

There are many electrooptic crystals with different characteristics. Furthermore, to be exact, one should solve the wave equation for the given channel waveguide structure to calculate the change of the effective index of each mode due to the index change ($\Delta n_1$) or ($\Delta n_2$) which represents the change of the bulk index along the polarization direction of each mode. However, such exact calculation would alter neither the basic virtue of the present invention nor the numerical values for required voltages $V_1$ and $V_2$ and their ratio by any substantial amount.

Figure 6:
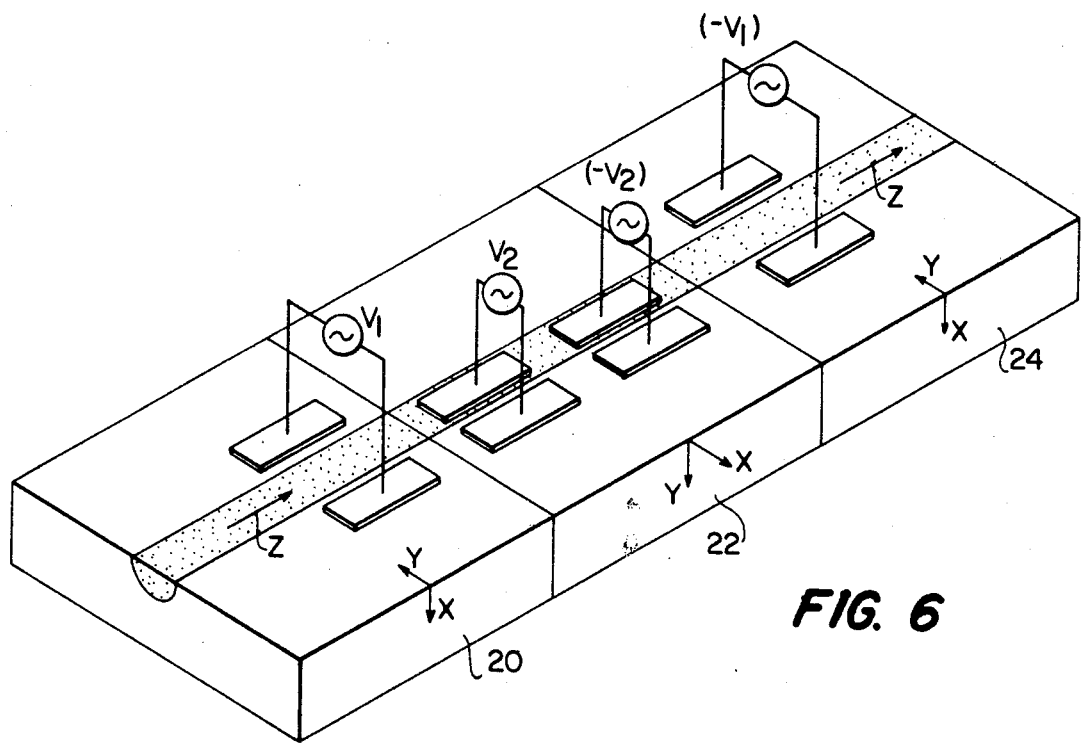
FIG. 6 is a perspective diagram showing a way to apply the concept of this invention to the switching scheme where two voltages of opposite sign are needed for each polarization.

It is also clear that more than two blocks can be butt-jointed in series in the same fashion as shown in FIG. 3. Such multiplicity of connections would be required when one propagating mode needs more than one pair of electrodes to be successfully switched or modulated. For example, in the switching device of Kogelnik and Schmidt (IEEE Journal of Quantum Electronics, Vol. QW-12, p. 396 (1976), two pairs of electrodes are needed for each mode (polarization), one operating at an applied voltage V, the other at ($-V$). FIG. 6 shows a way of realizing the device for both polarizations utilizing three blocks 20, 22, 24 in series. As shown, in all three blocks 20, 22, 24, electric fields are designed to be dominantly parallel to the Y-axis, thus ensuring the strongest electrooptic effect in all blocks 20, 22, 24. By alternating the X- and Y-axis as shown, one makes sure that both orthogonal polarizations of propagating modes experience the same amount of electrooptic effect as described above in relation to FIG. 3.

It is clear that the waveguide blocks may possess any shape so long as the waveguide regions are well aligned and connected so as to smoothly transfer the optical wave from one block to the next.

Figure 7:
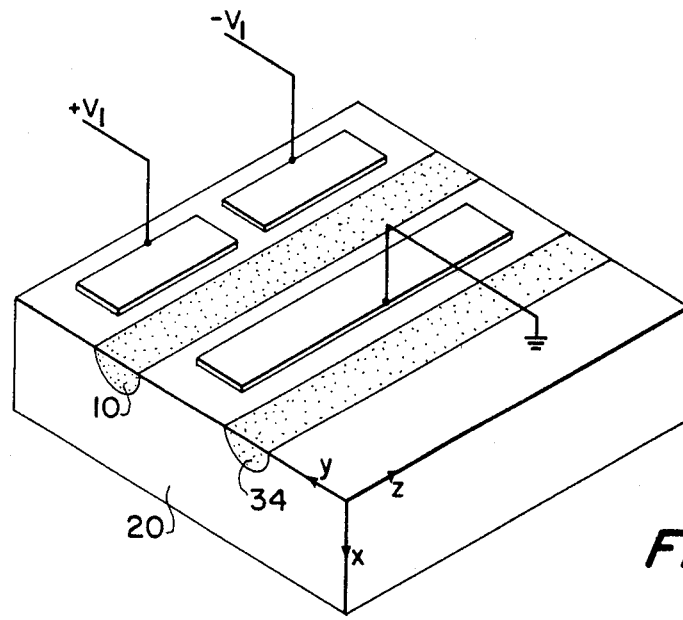
FIG. 7 is a perspective view of a basic switched coupler in the art.

A switched coupler in accordance with the teachings of Kogelnik and Schmidt (Switched Directional Couplers with Alternating $\Delta\beta$, IEEE Journal of Quantum Electronics, Vol. QE-12, No. 7, July 1976, p. 396) is shown in FIG. 7. This device could be coupled to input and output waveguide sections or to optical fibers. The device has exhibited excellent performance in terms of cross-talk with substantially relaxed fabrication tolerance. However, it works only when the optical input signal has a specific polarization, viz., parallel to the Y-axis.

Figure 8:
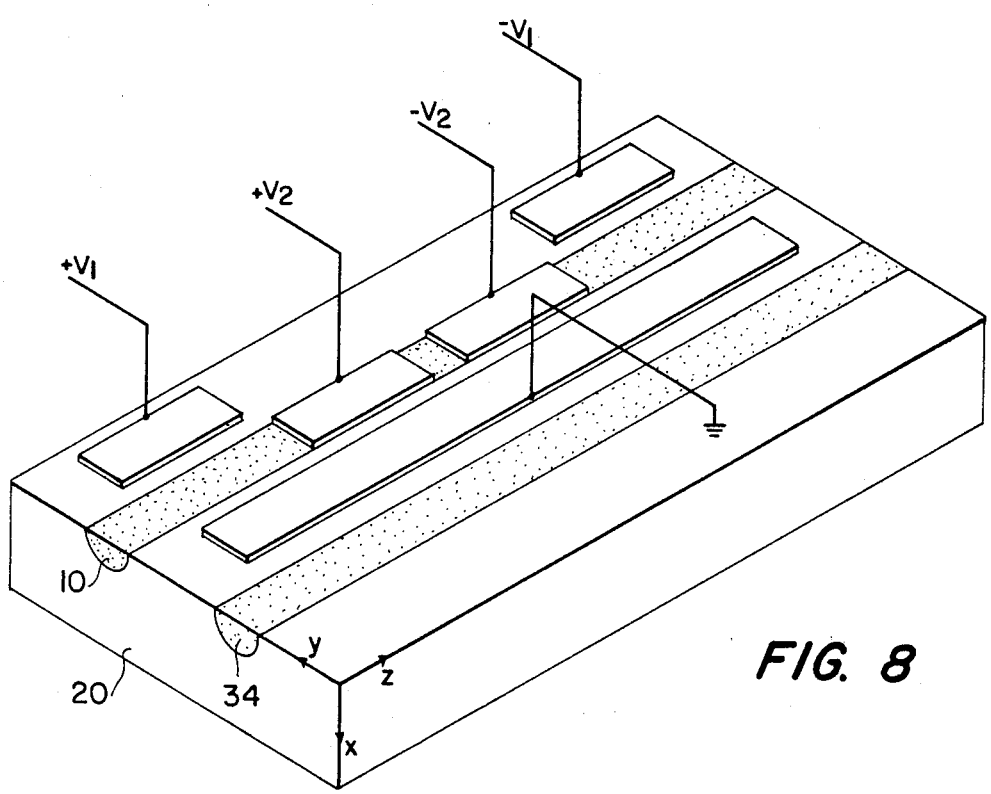
FIG. 8 is a perspective view of a switched coupler which is polarization-insensitive.

To make the switch polarization-insensitive, four sets of electrodes as shown in FIG. 8 (corresponding to FIG. 2 of Steinberg, Giallorenzi and Priest, "Polarization-insensitive integrated-optical switches: a new electrode design", Applied Optics, Vol. 16, No. 8, Aug. 1977, p. 2166) can be used. Using two sets of voltages, ($\pm V_1$, and $\pm V_2$) both polarizations can be switched at the same time. However, since the electrooptic effect is stronger along one (e.g., the Y) direction, the magnitude of $V_2$ must be substantially larger than that of $V_1$ (or vice versa). In the case of LiNbO$_3$ crystal, the ratio is about three to one.

Figure 9:
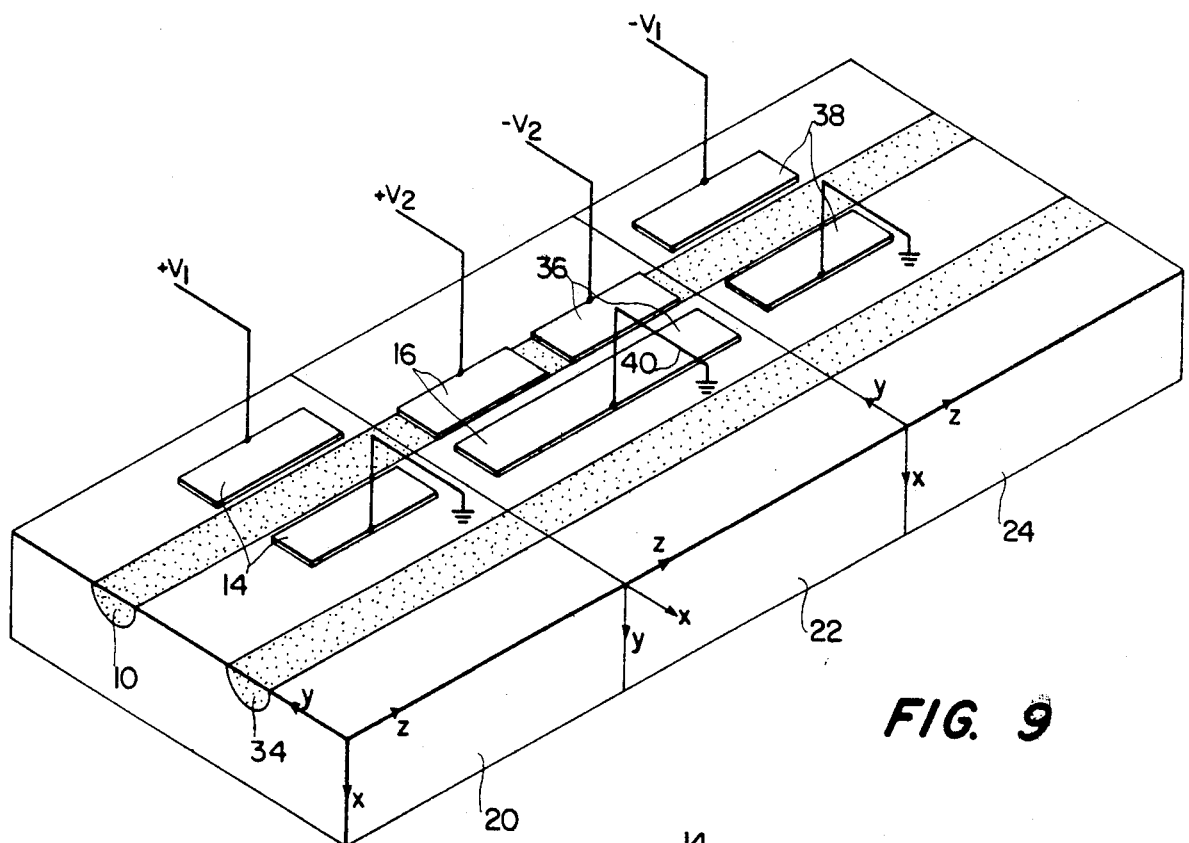
FIG. 9 is a perspective view of an embodiment of a modulating/switching device in accordance with the present invention.

To reduce the driving voltage $V_2$ and make $V_1$ and $V_2$ about the same in value, the $\Delta\beta$ reversal switch shown in FIG. 9 can be fabricated on the three blocks (20, 22, 24) of substrate. Here, the X- and Y-axes of the crystal are alternated from block to block and the electrodes (14, 16, 36, 38) are positioned in such a way that the electric fields are substantially parallel to the Y-axis (which has been assumed to be the easy axis) in each block. Thus, the electro-optic effect is utilized to its maximum in each block and, furthermore, optical beams with both orthogonal polarizations experience approximately the same electro-optic effects. As a result, in FIG. 9, $V_1$ and $V_2$ are each about equal in magnitude to the smaller of $V_1$ and $V_2$ in FIG. 8.

It is to be noted that for best operation, the applied fields and voltages should be symmetrical about a center. Thus, with ground lead 40 considered as the center of symmetry, to the left are voltages $V_2$ and $V_1$ in that order and to the right are voltages $V_2$ and $V_1$. Also, to the left are a vertically directed and then a horizontally directed field and to the right a vertically directed and then a horizontally directed field. The requirement of symmetry for optimum performance leads to the necessity for three blocks rather than two.

Also, as shown in FIG. 9, the polarity of voltages leads to switching of signals between the waveguides. Straight-through propagation can be obtained by making the negative polarities positive, so that the voltages would then be $+V_1$ across electrodes 14, $+V_2$ across electrodes 16, $+V_2$ across electrodes 36, and $+V_1$ across electrodes 38.

Figure 10:
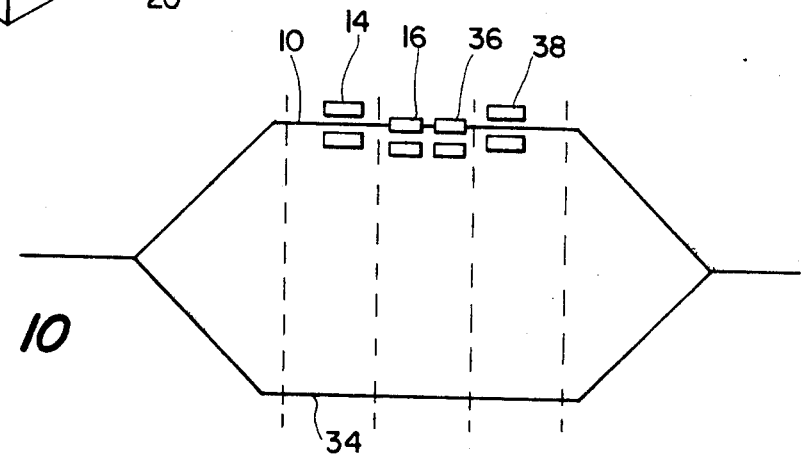
FIG. 10 is a schematic illustration of a complete on-off switch in accordance with the present invention.
Figure 11:
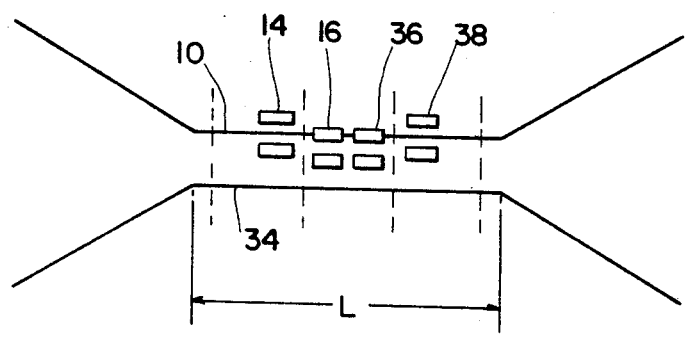
FIG. 11 is a schematic illustration of a complete reversal or cross-over switch in accordance with the present invention.

FIGS. 10 and 11 show in schematic form different types of switches, that in FIG. 10 operating as an on-off switch and that in FIG. 11 as a cross-over switch with an interaction region, L, between the waveguides 10 and 34. As is obvious, the electrode, voltage and block arrangement of FIG. 9 can be used for both switches, the blocks 20, 22, and 24 being indicated by the areas between the dashed lines.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In an electrooptical waveguide modulating/-switching device having at least two waveguide channels formed on a crystalline substrate, switching and modulation being effected by changing the propagation constant of one of said waveguides by means of vertical and horizontal electric fields applied to one of said waveguides by sets of voltage-bearing electrodes when an optical signal is propagated through said one waveguide, the improvement comprising:

a substrate which is formed in sections, each containing at least one set of said electrodes and a portion of said waveguides extending to at least one edge of said substrate section, said sections being abutted so that said waveguide portions couple together effectively to form two spaced waveguides, alternating substrate sections being placed together so that the easy axis of one substrate section is orthogonal to that of each abutting section, the electrodes being arranged so that the horizontal and vertical electric fields are physically symmetrical about a center of symmetry and so that equal numbers of sets of electrodes for applying a vertical and a horizontal field are on each side of said center of symmetry.

2. An electrooptical device as in claim 1, wherein:
the number of substrate sections is three,
the left-hand section containing a first set of electrodes for applying a horizontal field to one waveguide,
the middle section containing a second and a third set of electrodes, both sets for applying a vertical field to said one waveguide, and the right-hand section containing a fourth set of electrodes for applying a horizontal field to said one waveguide.

3. An electrooptical device as in claim 2, wherein:
said first and fourth set of electrodes have means for connection to a source of voltage of one magnitude, and
said second and third set of electrodes have means for connection to a source of voltage of another magnitude.

* * * * *